United States Patent
Mathew (10) Patent No.: US 9,456,064 B1
(45) Date of Patent: Sep. 27, 2016

(54) APPARATUS FOR REMOVABLY COUPLING A MOBILE DEVICE TO AN EXTERNAL OBJECT

(71) Applicant: Shelby Mathew, Pembroke Pines, FL (US)

(72) Inventor: Shelby Mathew, Pembroke Pines, FL (US)

( * ) Notice: Subject to any disclaimer, the term of this patent is extended or adjusted under 35 U.S.C. 154(b) by 0 days.

(21) Appl. No.: 15/163,567

(22) Filed: May 24, 2016

Related U.S. Application Data (63) Continuation of application No. 14/852,569, filed on Sep. 13, 2015, now abandoned.

(60) Provisional application No. 62/052,107, filed on Sep. 18, 2014.

(51) Int. Cl.
*H04M 1/04* (2006.01)
*H04M 1/60* (2006.01)
*H04M 1/02* (2006.01)

(52) U.S. Cl.
CPC .............. *H04M 1/04* (2013.01); *H04M 1/0279* (2013.01); *H04M 1/6075* (2013.01)

(58) Field of Classification Search
CPC ............ H04L 65/1059; H04L 65/602; H04M 1/0254; H04M 1/0237; H04M 1/05; H04M 1/6075; H04M 1/6083; H04M 1/6091; H04M 1/04; H04M 1/0279; B60R 2011/0075; B60R 2011/0056; B60R 2011/0071; B60R 2011/0005; B60R 11/00; B60R 2011/0059; B60R 11/0252; B60R 2011/0089; B60R 2011/0085; B60R 2011/0052; F16M 11/06; F16M 11/08; F16M 11/2078; F16M 11/26; F16M 13/04; F16M 47/00; H01F 7/0252; A45F 2005/002
See application file for complete search history.

(56) References Cited

U.S. PATENT DOCUMENTS

| | | | |
|---|---|---|---|
| 6,264,887 B1 | 7/2001 | Farmer | |
| 6,888,940 B1* | 5/2005 | Deppen | B60R 11/0241 379/446 |
| 7,162,278 B2* | 1/2007 | Vanselous | H04M 1/6075 455/346 |
| 2002/0100782 A1* | 8/2002 | Marvin | B60R 11/0241 224/483 |
| 2005/0196999 A1* | 9/2005 | Chang | B60R 11/0241 439/345 |
| 2008/0296332 A1* | 12/2008 | King | B60R 7/08 224/549 |
| 2010/0327031 A1 | 12/2010 | Olmos | |
| 2011/0024470 A1* | 2/2011 | Hajarian | B60R 11/0241 224/276 |
| 2011/0034221 A1* | 2/2011 | Hung | A45C 11/00 455/575.8 |
| 2013/0088881 A1 | 4/2013 | Su | |
| 2015/0239404 A1 | 8/2015 | Lee | |

OTHER PUBLICATIONS

U.S. Appl. No. 29/175,285, filed Jun. 29, 2004, Phillip, J. Mottini.

* cited by examiner

*Primary Examiner* — Nizar Sivji

(57) ABSTRACT

An apparatus for coupling a mobile device to an automobile console area comprising a mobile device element configured to adhere to a mobile device surface and defining a middle elongated shaped element aligned parallel between a right and a left elongated shaped element. A right score is configured to allow a right shoulder element and the right elongated shaped element to break away from the middle elongated shaped element. A left score is configured to allow a left shoulder element and the left elongated shaped element to break away from the left side of the middle elongated shaped element. A middle score is configured to allow a portion of the middle elongated shaped element to break away from a remainder of the middle elongated shaped element. A coupling element is configured to be removably coupled with a console area of an automobile and to the mobile device element.

21 Claims, 7 Drawing Sheets

APPARATUS FOR REMOVABLY COUPLING A MOBILE DEVICE TO AN EXTERNAL OBJECT

CROSS-REFERENCE TO RELATED APPLICATIONS

This application is a continuation of U.S. non-provisional patent application Ser. No. 14/852,569, filed Sep. 13, 2015, entitled "Customizable Compact Disposable Smartphone Vehicle Mount For Enhancing Accessibility, Viewing, Communications, And Safety", which claims priority to the provisional patent application 62/052,107, filed Sep. 18, 2014, entitled "Devices for Enhancing Accessibility, Viewing, Communications, and Safety on Conveyances in Relation to Mounting a Mobile Smartphone Device", the entire contents of both applications are hereby incorporated by reference herein.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of mobile devices, and more specifically to devices for supporting mobile devices.

BACKGROUND

The popularity and usage of mobile devices and more specifically smartphone devices have grown rapidly over the past decade. Mobile phones were first introduced as a luxury item for the few people able to afford them, but have since grown into a mass-produced mobile smartphone device that has become more affordable and readily available to nearly anyone.

Initially, the sole purpose of a mobile cell phone was to conduct a phone call, but it has significantly evolved over time to become a feature-rich mobile smartphone device capable of performing a myriad of technological operations. Today's smartphone devices possess advance technology and significant memory capacity allowing them to function with increased processing speed and function as a minicomputer with a variety of software applications.

Some of these applications include operating not only as a mobile phone and texting device, but also as an emailing device, Global Positioning System (GPS) navigation system, internet browser, digital spreadsheet, word processor, audio player, video player, gaming device, calculator, digital camera, and various other innovative mobile applications frequently being developed.

As the value-added features of mobile smartphone devices have progressively evolved, the importance of having a smartphone close at hand for convenient access has increased. Depending on the user need, smartphone applications are becoming vital for important functional operations, especially as smartphone features continue to advance. This is particularly true as smartphones are now needed more often inside of a vehicle. For some operations, they must be in close proximity to the user, be safely accessible, and have unobstructed viewing. For example, when using the Global Positioning System (GPS) feature of a smartphone inside a vehicle, users require direct, unobstructed viewing of the smartphone screen for visual guidance and the ability to clearly hear its turn-by-turn audio instructions to safely arrive at their desired destination. Without a safe way to secure the smartphone device in a vehicle, drivers tend to often dangerously hold the mobile phone in their hand during use, or alternatively, attempt to unsuccessfully secure it in a location that hazardously allows the mobile phone to slide around freely. This can cause a dangerous situation as drivers may divert their attention from the road ahead attempting to locate the phone, sometimes causing unpredictable car motions in an attempt to recover it. To help avoid a situation such as this, it is helpful to mount the mobile device in a secure location with easy and safe access, and also with unobstructed viewing.

Additionally, as a safety concern, many regulatory bodies are requiring hands-free use of mobile phones in a car, which is especially important if a user is using their smartphone to converse with someone. Having the phone mounted in a secure close-proximity location allows the user to speak and hear more clearly with the other party when using the speakerphone option available on nearly all mobile phones. Having a mobile phone mounted in close proximity to the user would also enable the user to more easily use the speakerphone feature or a separate corded earpiece and microphone without significant cord length limitations, allowing hand-free use. A secure and close proximity mounting of the phone also allows the user to visually screen callers before answering, and to easily accept calls or disconnect calls as needed.

There are various phone car mounts on the market that can hold a mobile device inside a vehicle. However, most car phone mounts are either too bulky, or do not effectively secure a phone, or require significant surface space to mount, or are difficult to install, or do not easily release the phone, or are difficult to latch or unlatch a phone with one hand, or are mounted in a far-reaching window position, or are mounted in an awkward viewing position, or are costly to purchase for temporary use, or a combination thereof.

Additionally, most vehicle consoles today are tightly fitted with various knobs, displays, switches, and other protruding or depressed compartments, leaving little for mounting additional accessories, such as a phone car mount. This is especially true for most phone mount bases, as they typically have a medium to large size base needing significant vehicle console surface area to secure it.

Due to these issues, it is difficult and cumbersome for business travelers and vacationers, especially airline travelers either forgetting or attempting to minimize packing space, to use the phone car mounts that are currently available. Vacationers and business travelers frequently use rented or borrowed vehicles for their short-term transportation needs. Most car rental usually offer a GPS navigation option as a separately priced premium upgrade for an additional daily rate. But this GPS upgrade option is often expensive, and is no longer needed by vehicle renters who already possess a smart phone with an installed GPS application. However, to use their smartphone with the GPS application, they must entirely remove their existing phone car mount from their personal vehicle, pack the phone car mount, re-install the phone car mount in the rental car, and then remember to remove it so it can be packed for the return trip. Since many phone car mounts are very difficult to un-install and re-install, or are of a permanent type, they are not ideal for travel purposes or disposable use. Others that succeed in removing and packing the car mount, may forget to remove the car mount from the rental car, resulting in the need to purchase another, often expensive, phone car mount. As a result, there is a need for an improvement over the prior art devices for mounting a mobile device within an automobile or to external surfaces.

SUMMARY

An apparatus for coupling a mobile device to an automobile console area is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an apparatus for coupling a mobile device to an automobile console area is disclosed. The apparatus comprises a mobile device element. The mobile device element comprises a mobile device facing surface and an opposing rear surface. The mobile device facing surface comprises adhesive material for adhering to a mobile device surface. The mobile device element comprises a middle elongated shaped element aligned parallel between a right elongated shaped element and a left elongated shaped element. A right shoulder element is positioned at a first end of the right elongated shape element. The right shoulder element is coupled to a right side of a first end of the middle elongated shaped element. A right score spans a width of the right shoulder element. The right score is configured to allow the right shoulder element and right elongated shaped element to break away from the right side of the middle elongated shaped element. A left shoulder element is positioned at a first end of the left elongated shape element. The left shoulder element is coupled to a left side of the first end of the middle elongated shaped element. A left score spans a width of the left shoulder. The left score is configured to allow the left shoulder element and left elongated shaped element to break away from the left side of the middle elongated shaped element. A first catching feature is proximate to the first end of the middle elongated shaped element. The first catching feature is configured to mate with a second catching feature of a coupling element. A middle score is presented on the first end of the middle elongated shaped element. The middle score spans a width of the middle elongated shaped element and is configured to allow a portion of the middle elongated shaped element to break away from a remainder of the middle elongated shaped element. A coupling element is configured to be removably coupled with a console area of an automobile and to the mobile device element. The coupling element comprises a console attaching section for removably coupling the coupling element to the console area, and, a second catching feature opposing the console attaching section. The second catching feature is configured to mate with the first catching feature so that the mobile device element can be removably coupled with the coupling element.

Additional aspects of the disclosed embodiment will be set forth in element in the description which follows, and in element will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a mobile device element that is substantially planar and disposable having an adhesive surface that attaches to a back or surface of a mobile device or its protective case, which can be removably attached to an automobile console and/or air vent by a coupling element. The device element is configured to adhere to a plurality of mobile devices without obstructing capturing and light emitting components of each mobile device by breaking away at least one elongated shaped element from the remainder of the mobile device element before adhering the mobile device element to a mobile device. The mobile device element includes perforations or scores on each of the elongated elements of the mobile device element to enable the user to easily detach portions of the mobile device element so as to adapt the shape of the mobile device element such that a camera lens, camera flash, a speaker, sensors, for example, are unobstructed by the mobile device element. The present invention improves over the prior art by providing a less difficult and less cumbersome device for business travelers and vacationers to use than the existing mobile device mounts that are currently available. The present invention improves over the prior art by providing a disposable mobile device mount that that be easily attached to a plurality of mobile phone or mobile devices.

Figure 4A:
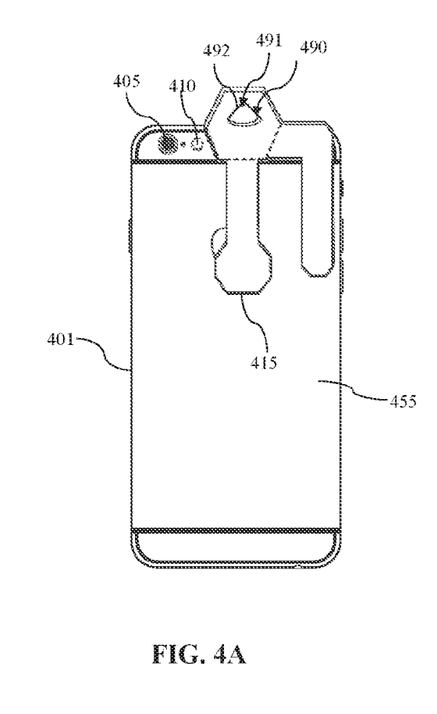
FIG. 4A is a rear view of a mobile device element coupled to a mobile device, wherein the right elongated shaped element and shoulder have been removed and therefore not obstructing the light emitting and capturing devices of the mobile device, according to an example embodiment.
Figure 4B:
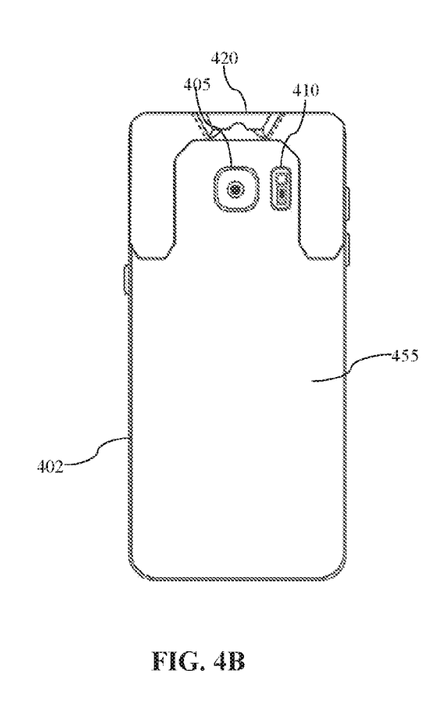
FIG. 4B is a rear view of a mobile device element coupled to a mobile device, wherein the middle elongated shaped element has been removed and therefore not obstructing the light emitting, and capturing devices of the mobile device, according to an example embodiment.
Figure 4C:
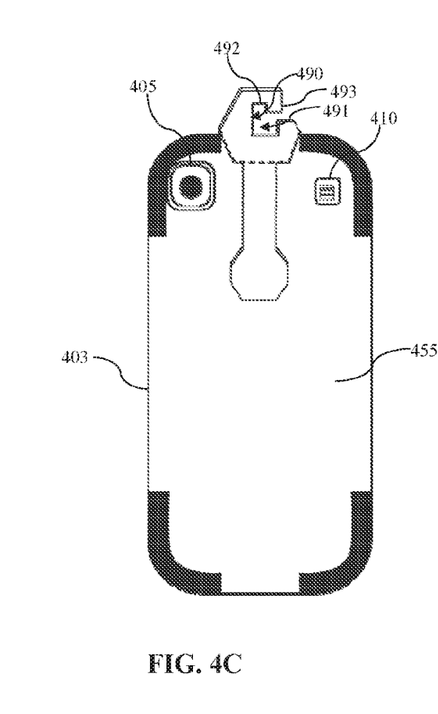
FIG. 4C is a rear view of a mobile device element coupled to a mobile device, wherein the left and right elongated shaped elements and shoulders have been removed and therefore not obstructing the light emitting and capturing devices of the mobile device, according to an example embodiment.

Referring now to the Figures, FIG. 1A-1D are front, perspective, side and rear views, respectively, of a mobile device element 105 of an apparatus 100 for coupling a mobile device to an automobile console area (as further illustrated in FIGS. 7A and 7B), according to one example embodiment. Throughout this document the term mobile device may include a tablet, cellular phone, hand held device etc. It is also understood that the term mobile device may also include a mobile device covered with a case or cover for protective purposes. Such mobile device covers or case are known to those skilled in the art. A mobile phone case is configured to cover at least a portion of the rear surface of a mobile and such cases and covers are well known to those skilled in the art. The mobile case comprises at least a substantially planar surface such that when the case covers the mobile device, at least a portion of the rear surface of the mobile device is covered. The mobile device element 105 is configured to adhere to the rear surface 455 of a mobile device. (as illustrated in FIGS. 4A-4C). The mobile device element may comprise a polymer material such as but not limited to PVC (polyvinyl chloride), PET (polyethylene terephthalate), PP (polypropylene), HDPE (high-density polyethylene), Nylon, or a combination there of. Additionally, other materials, such as wood, aluminum, cardboard, etc. may also be used and are also within the spirit and scope of the present invention.

The mobile device element has a mobile device facing surface 107 that is configured to attach to the surface of the mobile device. In the present embodiment, an adhesive layer 127 is deposited on the mobile device facing surface of the mobile device element. The adhesive used may be a water-based acrylic glue. However other pressure sensitive adhesive components, such as polyethyelenes, polysiloxanes, ployisobutylenes, polyacrylates, polyacryclamides, polyurathenes, plasticized ethylene-vinyl acetate copolymers and tack rubber, may be used. In other embodiments, adhesive may be applied as it plurality of bodies as opposed to a continuous layer. However, other means of attaching the mobile device elements to a mobile phone or other mobile device are also within the spirit and scope of the present invention. The adhesive layer may be such that the mobile device element can be substantially permanently attached to the rear surface of a mobile device. In other embodiments, the adhesive layer may be such that mobile device elements can be removably coupled to the rear surface of a mobile phone, mobile device or mobile device case or cover. The mobile device element is configured to couple to a plurality of different mobile device cases without obstructing a capturing device and a light emitting device of the mobile device covered by each case by breaking away at least one elongated shaped element.

A backing may be affixed to the top of the adhesive layer and can be removed before placement coupling the mobile device element to a mobile device. The backing can comprise a material such as wax paper such that the adhesive layer retains its adhesive properties and prevents the mobile device element from being stuck somewhere unwantedly during manufacturing and transportation.

The mobile device element comprises a middle elongated shaped element 115 aligned parallel between a right elongated shaped element 120 and a left elongated shaped element 125. A right shoulder element 130 is at a first end 135 of the right elongated shape element. The right shoulder element is coupled to a right side 145 of a first end 150 of the middle elongated shaped element. A right score 155 spans the width of the right shoulder element. The right score is configured to allow the right shoulder element and right elongated shaped element to break away from the right side of the middle elongated shaped element.

Similarly, on the left side of the middle elongated shaped element, a left shoulder element 165 is positioned at a first end 170 of the left elongated shape element. The left shoulder element is coupled to a left side 180 of the first end 150 of the middle elongated shaped element. A left score 185 spans the width of the left shoulder. The left score is configured to allow the left shoulder element and left elongated shaped element to break away from the left side of the middle elongated shaped element.

Additionally, a middle score 195 is presented on the first end 150 of the middle elongated shaped element 115. Similar to the other scores, the middle score spans a width of the middle elongated shaped element and is configured to allow a portion of the middle elongated shaped element to break away from a remainder of the middle elongated shaped element. In the present embodiment, the middle, left and right elongated shaped elements, and the left and right shoulders are substantially planar shaped bodies. However, other shapes may also be used provided that the mobile device facing surface 107 is configured to couple to a mobile device. The material comprising the left and right shoulders, left, middle and right elongated shape elements may also comprise material having properties providing flexibility or allowing the components of the mobile device element to adapt to the shapes and contours of the mobile devices when coupled to the rear surfaces of the mobile devices.

A second score 141 may be presented on the mobile device element between the middle score 195 and the second end 160 of the middle elongated shaped element. The middle score is configured to allow a second portion of the middle elongated shaped element to break away from a remainder of the middle elongated shaped element. The scores may be perforations or perforated areas to enable a user to detach or break away sections of the mobile device element more easily so as to adapt the shape of the mobile device element so that when the mobile device element is attached to a mobile device, the mobile device element does not obstruct light emitting and capturing devices of the mobile device, such as a camera lens, a microphone, a speaker, for example.

The mobile device element is configured such that portions of the mobile device element can be removed such that the mobile device element can be coupled to the rear surface of a mobile device without obstructing the light emitting device and capturing device of a mobile phone or device (as will be further explained below).

A first catching feature 190 is proximate to the first end 150 of the middle elongated shaped element 115. The first catching feature is configured to mate with a second catching feature of a coupling element (as will be further explained below). In one non-limiting example, the first catching feature comprises an aperture on a non-planar body 161 proximate to a first end 150 of the middle elongated shaped element. An aperture 191 presented on the non-planar body defines a lip 192 configured for retaining the second catching feature thereon (further explained below).

FIG. 2A-2D are front, perspective, side and rear views, respectively, of another example embodiment of a mobile device element. In this example embodiment, the first catching feature is such that the first end 216 of the catching feature is flush with the first end of the mobile device element. The mobile device element illustrated in FIGS. 2A-2D also comprises a middle elongated shaped element 215 aligned parallel between a right elongated shaped element 220 and a left elongated shaped element 225. A right shoulder element 230 is at a first end 235 of the right elongated shape element. The right shoulder element is coupled to a right side 245 of a first end 250 of the middle elongated shaped element. A right score 255 spans the width of the right shoulder element. The right score is configured to allow the right shoulder element and right elongated shaped element to break away from the right side of the middle elongated shaped element.

Similarly, on the left side of the middle elongated shaped element, a left shoulder element 265 is positioned at a first end 270 of the left elongated shape element. The left shoulder element is coupled to a left side 280 of the first end 250 of the middle elongated shaped element. A left score 285 spans the width of the left shoulder. The left score is configured to allow the left shoulder element and left elongated shaped element to break away from the left side of the middle elongated shaped element.

A middle score 295 is presented on the first end 250 of the middle elongated shaped element 215. Similar to the other scores, the middle score spans a width of the middle elongated shaped element and is configured to allow a portion of the middle elongated shaped element to break away from a remainder of the middle elongated shaped element. In the present embodiment, the middle, left and right elongated shaped elements, and the left and right shoulders are substantially planar shaped bodies. However, other shapes may also be used provided that the mobile device facing surface 207 is configured to couple to a mobile device. The mobile device element is configured such that portions of the mobile device element can be removed such that the mobile device element can be coupled to the rear surface of a mobile device without obstructing the light emitting device and capturing device of a mobile phone or device (as will be further explained below).

FIGS. 2A-2D also illustrate another embodiment of the first catching feature. First catching feature 295 of FIGS. 2A-2D is proximate to the first end 150 of the middle elongated shaped element 215. The first catching feature is configured to mate with a second catching feature of a coupling element (as will be further explained below). In one non-limiting example, the first catching feature comprises an aperture 291 on a non-planar body 262 proximate to a first end 250 of the middle elongated shaped element. An aperture 291 presented on the non-planar body defines a lip 292 configured for retaining the second catching feature thereon (further explained below).

The mobile device element illustrated in FIGS. 2A-2D is also configured to adhere to the rear surface 455 of a mobile device. (as illustrated in FIGS. 4A-4C). The mobile device element may comprise a polymer material such as but not limited to PVC (polyvinyl chloride), PET (polyethylene terephthalate), PP (polypropylene), HDPE (high-density polyethylene), Nylon, or a combination there of. Additionally, other materials, such as wood, aluminum, cardboard, etc. may also be used and are also within the spirit and scope of the present invention.

In both embodiments of the mobile device element illustrated in FIGS. 1A-2D, at the second end 160, 260 of the middle elongated shaped element is a portion that has an area larger than the area of the remaining middle elongated shaped element. This shape provides additional surface area for the mobile device element attached to a mobile device. This shape can facilitate in maintaining the mobile device element coupled to the rear surface of a mobile phone or device.

Figure 1A:
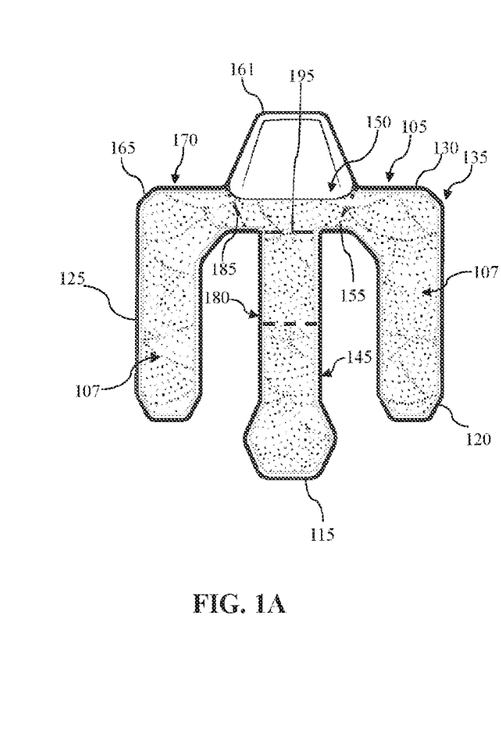
FIG. 1A is a front view of a mobile device element of an apparatus for coupling a mobile device to an automobile console area, according to one example embodiment.
Figures 1B, 1C:
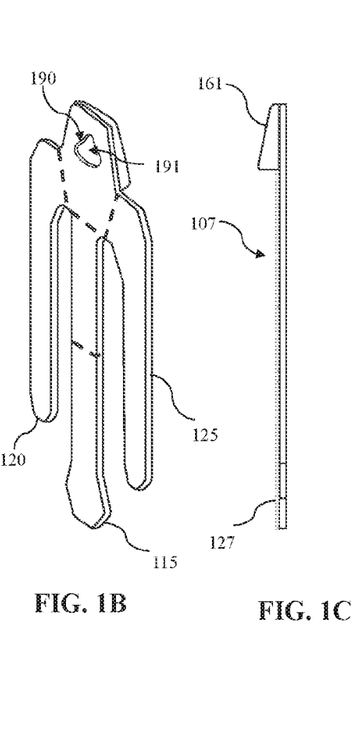
FIG. 1B is a perspective view of a mobile device element of an apparatus for coupling a mobile device to an automobile console area, according to one example embodiment.
FIG. 1C is a side view of a mobile device element of an apparatus for coupling a mobile device to an automobile console area, according to one example embodiment.
Figure 1D:
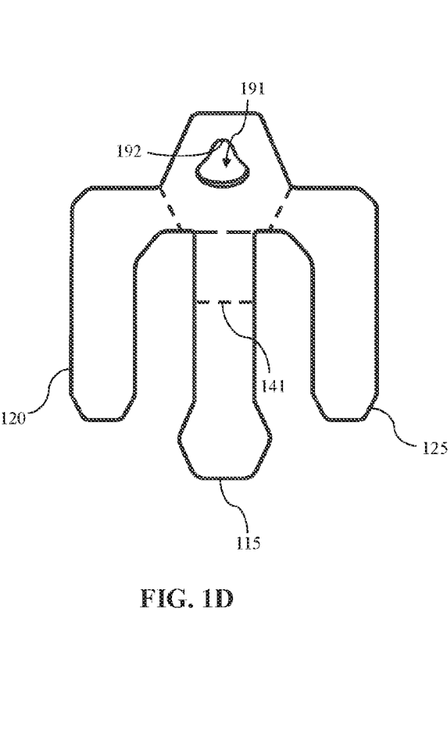
FIG. 1D is a rear view of a mobile device element of an apparatus for coupling a mobile device to an automobile console area, according to one example embodiment.
Figure 2A:
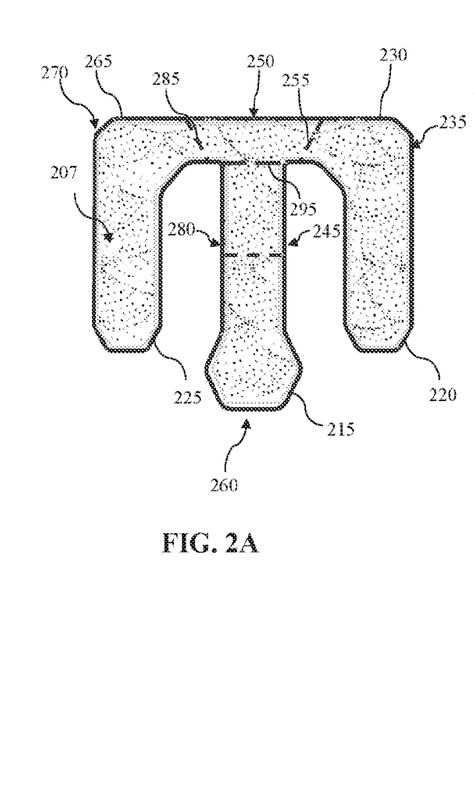
FIG. 2A is a front view of a mobile device element of an apparatus for coupling a mobile device to an automobile console area, according to another example embodiment.
Figure 2B:
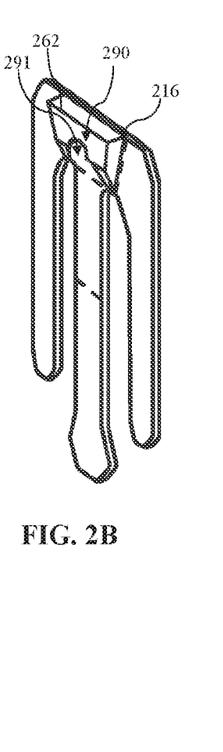
FIG. 2B is a perspective view of a mobile device element of an apparatus for coupling a mobile device to an automobile console area, according to another example embodiment.
Figure 2C:
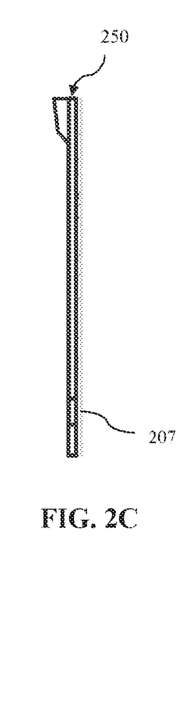
FIG. 2C is a side view of a mobile device element of an apparatus for coupling a mobile device to an automobile console area, according to another example embodiment.
Figure 2D:
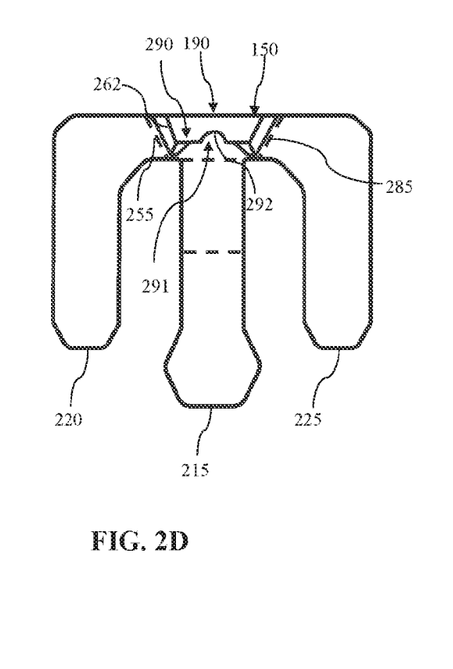
FIG. 2D is a rear view of a mobile device element of an apparatus for coupling a mobile device to an automobile console area, according to another example embodiment.
Figure 3A:
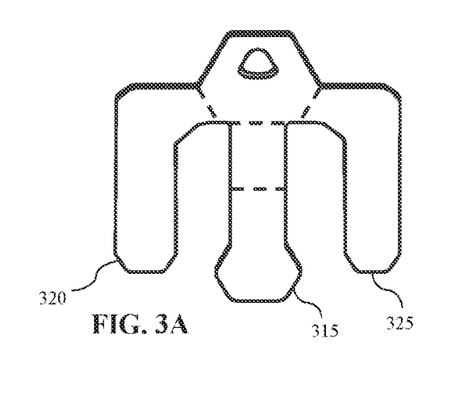
FIG. 3A is a rear view of a mobile device element of an apparatus for coupling a mobile device to an automobile console area, having no portions of its elongated shaped elements removed, according to an example embodiment.
Figure 3B:
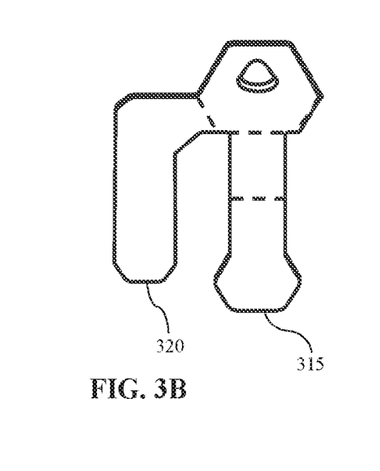
FIG. 3B is a rear view of a mobile device element of an apparatus for coupling a mobile device to an automobile console area, having its left elongated shaped element and shoulder removed, according to an example embodiment.
Figure 3C:
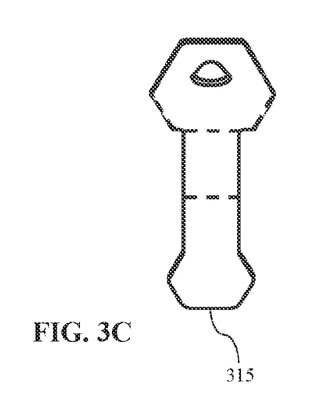
FIG. 3C is a rear view of a mobile device element of an apparatus for coupling a mobile device to an automobile console area, having its left and right elongated shaped elements and shoulders removed, according to an example embodiment.
Figure 3D:
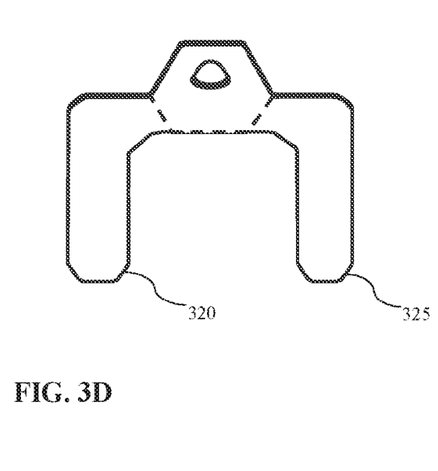
FIG. 3D is a rear view of a mobile device element of an apparatus for coupling a mobile device to an automobile console area, having its middle elongated shaped element removed, according to an example embodiment.
Figure 3E:
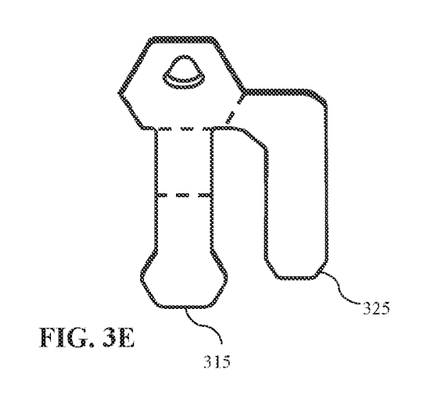
FIG. 3E is a rear view of a mobile device element of an apparatus for coupling a mobile device to an automobile console area, having its right elongated shaped element and shoulder removed, according to an example embodiment.
Figure 3F:
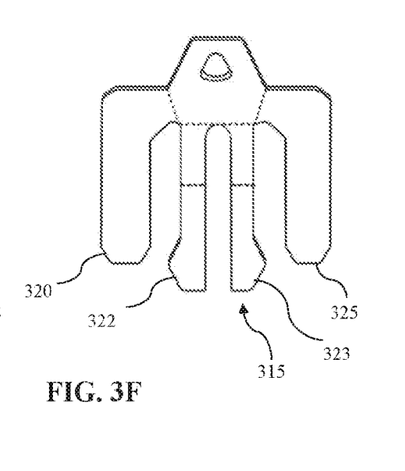
FIG. 3F is a rear view of a mobile device element of an apparatus for coupling a mobile device to an automobile console area, having a middle elongated element comprising a first prong and a second prong, according to an example embodiment.

The mobile device element is configured to couple to a plurality of different mobile phone devices or mobile devices without obstructing a capturing device and a light emitting device of each mobile phone by breaking away at least one elongated shaped element. FIGS. 3A-3F are the different configurations of the mobile device element which may be used. FIG. 3A is a rear view of a mobile device element of an apparatus for coupling a mobile device to an automobile console area, having no portions of its elongated shaped elements 320, 315, 325 removed, according to an example embodiment. FIG. 3A illustrates how the mobile device element may be provided to a consumer so that the consumer can adapt the shape of the mobile device element so that the mobile device element does not obstruct a capturing device or a light emitting device of the mobile device. Similarly, FIG. 3F illustrates how the mobile device element may be provided to a consumer so that the consumer can adapt the shape of the mobile device element so that the mobile device element does not obstruct a capturing device or a light emitting device of the mobile device. FIG. 3F illustrates that the middle elongated member 315 comprises a first prong 322 adjacent to a second prong 323. In operation, a portion of each of the prongs can be removed so that any light emitting or capturing device is not obstructed. Additionally, the each of the prongs not removed will provide a greater amount of surface area that for which the mobile device element can be stuck onto the mobile device. FIG. 3B is a rear view of a mobile device element of an apparatus for coupling a mobile device to an automobile console area, having its left elongated shaped element and shoulder removed and having the right elongated shaped element 320 and shoulder remaining, according to an example embodiment. The embodiment illustrated in FIG. 3B can easily be adhered or coupled to the rear surface of a mobile device, such as a cellular telephone, without obstructing any light emitting or capturing devices. FIG. 3C is a rear view of a mobile device element of an apparatus for coupling a mobile device to an automobile console area, having its left and right elongated shaped elements and shoulders removed and having the middle elongated shaped element 315 remaining, according to an example embodiment. The embodiment illustrated in FIG. 3C can easily be adhered or coupled to the rear surface of a mobile device, such as a cellular telephone, without obstructing any light emitting or capturing devices (such as illustrated in FIG. 4C). FIG. 3D is a rear view of a mobile device element of an apparatus for coupling a mobile device to an automobile console area, having its middle elongated shaped element removed and having the right elongated shaped element 320 and left elongated shaped element 325 and shoulders remaining, according to an example embodiment. The embodiment illustrated in FIG. 3D can easily be adhered or coupled to the rear surface of a mobile device, such as a cellular telephone, without obstructing any light emitting or capturing devices (such as illustrated in FIG. 4B). FIG. 3E is a rear view of a mobile device element of an apparatus for coupling a mobile device to an automobile console area, having its right elongated shaped element and shoulder removed, according to an example embodiment. The embodiment illustrated in FIG. 3E can easily be adhered or coupled to the rear surface of a mobile device, such as a cellular telephone, without obstructing any light emitting or capturing devices (such as illustrated in FIG. 4A). FIG. 3F illustrates a mobile device element of an apparatus for coupling a mobile device to an automobile console area, wherein the middle element comprises two prongs. In addition, it is understood that these embodiments are non-limiting and other configurations that are within the spirit and scope of the present invention may also be used.

FIGS. 4A-4C are rear views of a mobile device element coupled to a rear surface 455 of a mobile device. FIG. 4A, illustrates a mobile device element adhered to the rear surface of an iPhone™. As illustrated in FIG. 4A, the iPhone™ has a light emitting device 410, such as a camera flash, and the capturing, or camera device 405 on the right side of the first or upper end of the iPhone™ 401 The mobile device element has the right shoulder and right elongated shaped element removed thereby not obstructing the light emitting and capturing devices of the mobile device. In operation, before coupling the mobile device element to a mobile device, a user will apply force to the mobile device element such that the right shoulder and right elongated shaped element can be removed from the middle elongated shaped element. In operation, the score or perforated area enables a user to easily break away the portions required. FIG. 4A also illustrates another embodiment of the first catching feature 490. In the embodiment illustrated in FIG. 4A, the first catching feature is an aperture 491 on a planar shaped body. The aperture defines a lip 492. The first catching feature can be used to mate with the second catching feature with the coupling element.

The mobile device element can also be adapted to attach to the rear surface of a Samsung mobile Device™ 402 as illustrated in FIG. 4B. FIG. 4B, illustrates a mobile device element adhered to the rear surface of a Samsung™ mobile device. As illustrated in FIG. 4B, the Samsung™ mobile device has the light emitting device 410, such as a camera flash, and the capturing, or camera device 405 in the middle of the first or upper end of the Samsung™ mobile Device™. The mobile device element has a portion of the middle elongated shaped elements removed from a remainder 420 of the middle elongated element and therefore not obstructing the light emitting and capturing devices of the mobile device. In operation, a user will apply force to the mobile device element such that the middle elongated shaped element can be removed from the middle elongated shaped element. In operation, the score or perforated area enables a user to more easily breakaway a portion of the middle elongated shaped element by providing a weak point so that a use to break away the necessary portions of the mobile device element.

FIG. 4C, illustrates another example of a mobile device having the emitting device 410, such as a camera flash, on the left side of the mobile device's cover 403, and the capturing, or camera device 405 on the right side of the mobile device. FIG. 4C illustrates that the present invention may be coupled to a mobile device cover as well as a mobile phone. The mobile device element has the right and left shoulders and right and left elongated shaped elements removed and therefore not obstructing the light emitting and capturing devices of the mobile device. In operation, a user will apply force to the mobile device element such that the right shoulder and right elongated shaped element can be removed from the middle elongated shaped element. In operation, the score or perforated area enables a user to easily break away the portions required. FIG. 4C also illustrates another embodiment of the first catching feature 490. In the embodiment illustrated in FIG. 4C, the first catching feature is a hooked feature 493 defined by an aperture 491 on a planar shaped body. The aperture defines a lip 492.

Typically, for most Apple® mobile devices, the light emitting device and like every device is proximate to the right upper end of the device as illustrated in FIG. 4A. Typically, for most Samsung® mobile devices, the light emitting device and like every device is proximate to the right end of the device as illustrated in FIG. 4B. As illustrated in FIGS. 4A and 4B, the mobile device element is configured to couple an Apple® device (FIG. 4A) and a Samsung® mobile device (FIG. 4B) without obstructing a capturing device and a light emitting device of the mobile device by breaking away at least one elongated shaped element. Similarly, the mobile device element of the present invention is configured to couple to a plurality of different mobile device cases, for example as illustrated in FIG. 4C, without obstructing a capturing device and a light emitting device of the mobile device covered by each case by breaking away at least one elongated shaped element.

It is also understood that while the present embodiments do include shoulder perpendicular to the elongated shaped elements, other embodiments where the shoulder is diagonal or angled and not perpendicular may also be used. Such variations of the shape of the shoulder are within the spirit and scope of the present invention.

Figure 5A:
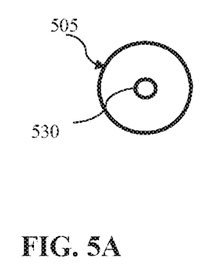
FIG. 5A is a front view of the coupling element of an apparatus for coupling a mobile device to an automobile console area, according to an example embodiment.
Figure 5B:
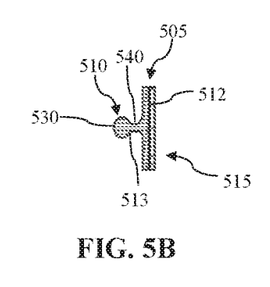
FIG. 5B is a side view of the coupling element of an apparatus for coupling a mobile device to an automobile console area, according to an example embodiment.
Figure 5C:
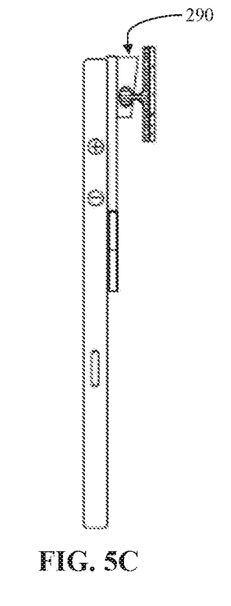
FIG. 5C is a side view of a mobile device having a mobile device element coupled to the rear of the mobile device, according to an example embodiment.
Figure 7A:
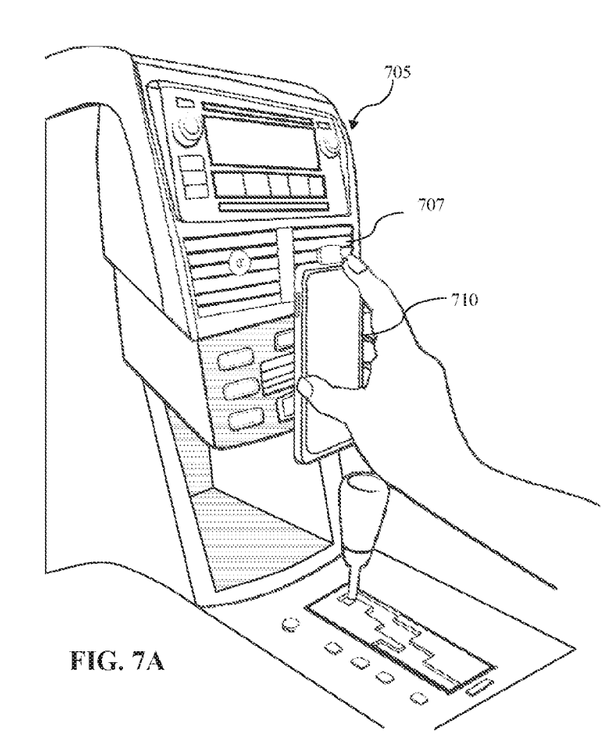
FIG. 7A is a perspective view of a mobile device being coupled to an air-vent of an automobile's console area, according to an example embodiment; and, FIG. 7B is a front perspective view of a mobile device coupled by the apparatus to an air-vent of an automobile's console area, according to an example embodiment.
Figure 7B:
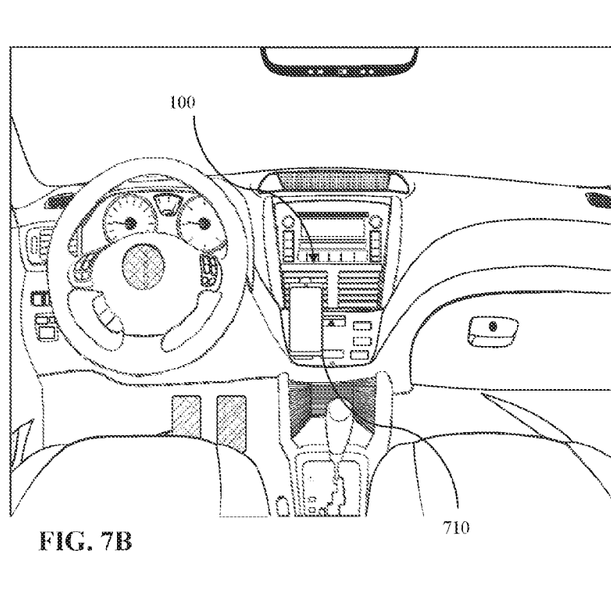

FIGS. 5A and 5B are a front and side views, respectively of the coupling element 505. The coupling element is used for coupling a mobile device having a mobile device element coupled thereon to an external surface or console area. FIG. 5C illustrates the coupling element 505 coupled with the mobile device element, according to one example embodiment. As mentioned above, the first catching feature 290 of the mobile device element is configured to mate with a second catching feature of the coupling element 505. The coupling element is configured to be removably couple a console area of an automobile to the mobile device element. The coupling element comprises a console attaching section 515 for removably coupling the coupling element to the console area 705 (as illustrated in FIGS. 7A and 7B). FIG. 5B illustrates that the console attaching section is a substantially flat surface and comprises an adhesive layer 512 deposited thereon. The adhesive layer may also include a backing similar to how the mobile device element includes a backing to prevent the adhesive layer from inadvertently attaching to an object. A second catching feature 510 opposes the console attaching section. The second catching feature is configured to mate with the first catching feature so that the mobile device element can be removably coupled with the coupling element. In one embodiment, the second attaching feature comprises a second lip 513 defined by a head 530 at a first end of the protruding element 540. In the present embodiment, the head is a bulbous shaped body. The head is configured to enter into the aperture 191, 291 of the first catching feature such that the first catching feature is hung on the second catching feature.

In operation, a user will adapt the mobile device element such that the capturing device and light emitting device of the mobile device are not obstructed by removing the necessary elongated shaped elements and/or shoulder elements by applying force such that the appropriate portions are moved or breakaway along the perforated area or scores.

Next, a user will remove the backing from the adhesive layer 512 of the coupling element 505 and attach it to a flat surface of an automobile console. Next, a user would position the first catching feature of the mobile device element such that the head 530 of the second catching feature catches on the left of the first catching feature. To remove the device from the console, the user would simply perform the steps in reverse. A user can easily remove the mobile device element from a mobile device by applying sufficient force to overcome the adhesive forces of the adhesive.

Figure 6A:
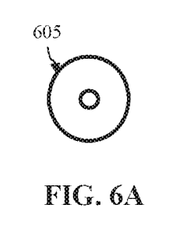
FIG. 6A is a front view of the coupling element of an apparatus for coupling a mobile device to an automobile console area, according to another example embodiment.
Figure 6B:
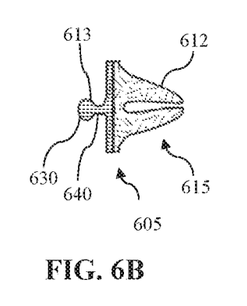
FIG. 6B is a side view of the coupling element of an apparatus for coupling a mobile device to an automobile console area, according to another example embodiment.
Figure 6C:
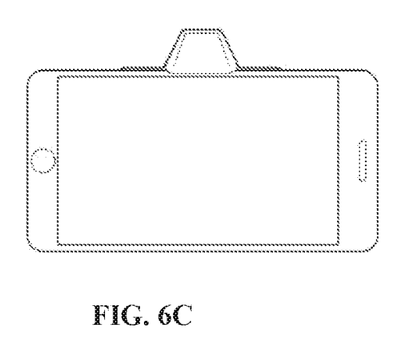
FIG. 6C is a front view of a mobile device having a mobile device element coupled to the rear of the mobile device, according to an example embodiment.
Figure 6D:
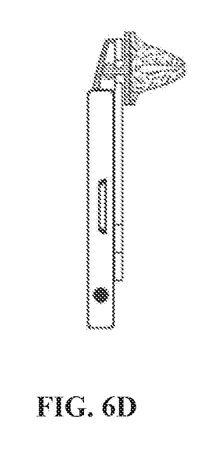
FIG. 6D is a side view of the coupling element coupled with the mobile device element, the mobile device element coupled to a mobile device, according to another example embodiment.

FIGS. 6A and 6B are front and side views, respectively, of the coupling element 605 for coupling a mobile device having a mobile device element coupled thereon, according to another example embodiment. FIG. 6C illustrates the coupling element 605 coupled with the mobile device element, according to one example embodiment. As mentioned above, the first catching feature 290 of the mobile device element is configured to mate with a second catching feature of the coupling element 605. The coupling element is configured to be removably coupled with a console area of an automobile and to the mobile device element. The coupling element comprises a console attaching section 615 for removably coupling the coupling element to the console area 705 (as illustrated in FIGS. 7A and 7B).

FIG. 6B illustrates at least one set of opposing prongs 612 that are configured to couple the coupling element to the air-conditioning vents of an automobile console (as illustrated in FIG. 7B). A second catching feature opposes the console attaching section or prongs. The second catching feature is configured to mate with the first catching feature so that the mobile device element can be removably coupled with the coupling element. In one embodiment, the second attaching feature comprises a second lip 613 defined by a head 630 at a first end of the protruding element 640. In the present embodiment, the head is a bulbous shaped body. The head is configured to enter into the aperture 191, 291 of the first catching feature (as illustrated in FIGS. 1A-2D) so that the mobile device element can be hung onto the head of the coupling element.

FIG. 6C is a front view of a mobile device having a mobile device element coupled to the rear of the mobile device, according to an example embodiment. FIG. 6C illustrates that the mobile device element can be attached to a mobile device such that the mobile device is horizontally aligned.

FIG. 7A is a perspective view of a mobile device being coupled to an air-vent of an automobile's console area and FIG. 7B is a front perspective view of a mobile device coupled by the apparatus to an air-vent of an automobile's console area. FIGS. 7A and 7B illustrate how the apparatus 100 can be used to easily attach a mobile device 710 to an air vent 707 of an automobile console. In other embodiments, as explained above, the coupling element may comprise an adhesive layer is configured to attach to a flat or substantially flat surface of an automobile console so as to not interfere with an air-conditioning vent. In operation, a user can easily couple and decouple (hang and unhang) the mobile device having a mobile device element coupled thereto from the coupling element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An apparatus for coupling a mobile device to an automobile console area, the apparatus comprising:
 a mobile device element, the mobile device element comprising a mobile device facing surface and an opposing rear surface, wherein the mobile device facing surface comprises adhesive material for adhering to a mobile device surface, the mobile device element defining:
  a middle elongated shaped element aligned parallel between a right elongated shaped element and a left elongated shaped element;
  a right shoulder element at a first end of the right elongated shaped element, the right shoulder element coupled to a right side of a first end of the middle elongated shaped element, wherein a right score spans a width of the right shoulder element, wherein the right score is configured to allow the right shoulder element and right elongated shaped element to break away from the right side of the middle elongated shaped element;
  a left shoulder element at a first end of the left elongated shaped element, the left shoulder element coupled to a left side of the first end of the middle elongated shaped element, wherein a left score spans a width of the left shoulder, wherein the left score is configured to allow the left shoulder element and left elongated shaped element to break away from the left side of the middle elongated shaped element;
  a first catching feature proximate to the first end of the middle elongated shaped element, wherein the first catching feature is configured to mate with a second catching feature of a coupling element;
  a middle score presented on the first end of the middle elongated shaped element, wherein the middle score spans a width of the middle elongated shaped element, the middle score configured to allow a portion of the middle elongated shaped element to break away from a remainder of the middle elongated shaped element;
 a coupling element configured to be removably coupled with a console area of an automobile and to the mobile device element, the coupling element comprising:
  a console attaching section for removably coupling the coupling element to the console area;
  a second catching feature opposing the console attaching section, wherein the second catching feature is configured to mate with the first catching feature so that the mobile device element can be removably coupled with the coupling element;
  wherein the mobile device element is configured to not obstruct a capturing device and a light emitting device of the mobile device by breaking away at least one elongated element.

2. The apparatus of claim 1, wherein the mobile device element is configured to couple to a plurality of different mobile devices without obstructing a capturing device and a light emitting device of the mobile device by breaking away at least one elongated shaped element.

3. The apparatus of claim 1, wherein the mobile device element is configured to couple to a plurality of different mobile device cases without obstructing a capturing device and a light emitting device of the mobile device covered by each case by breaking away at least one elongated shaped element.

4. The apparatus of claim 2, wherein the mobile device element is configured to be removably coupled to a rear surface of the mobile device.

5. The apparatus of claim 4, wherein the mobile device element is configured to couple to a rear surface of an Apple® mobile device without obstructing the light emitting device and capturing device by removing the right elongated shaped element and shoulder element from the middle elongated shaped element.

6. The apparatus of claim 4, wherein the mobile device element is configured to couple to a rear surface of a Samsung® mobile device without obstructing the light emitting device and capturing device by removing a portion of the middle elongated shaped element from a remainder of the middle elongated shaped element.

7. The apparatus of claim 4, wherein the first catching feature comprises an aperture proximate to a first end of the middle elongated shaped element, the aperture defining a lip configured for retaining the second catching feature thereon.

8. The apparatus of claim 7, wherein the second attaching feature comprises a second lip defined by a head at a first end of a protruding element.

9. The apparatus of claim 8, wherein a second score is positioned between the middle score and the second end of the middle elongated shaped element, the middle score configured to allow a second portion of the middle elongated shaped element to break away from a remainder of the middle elongated shaped element.

10. An apparatus for coupling a mobile device to a surface inside an automobile, the apparatus comprising:
 a mobile device element, the mobile device element comprising a mobile device facing surface and an opposing rear surface, wherein the mobile device facing surface comprises adhesive material for adhering to a mobile device surface, the mobile device element defining:
  a middle elongated shaped element aligned parallel between a right elongated shaped element and a left elongated shaped element;
  a right shoulder element proximate to a first end of the right elongated shaped element, the right shoulder element coupled proximate to a right side of a first end of the middle elongated shaped element;
  a left shoulder element proximate to a first end of the left elongated shaped element, the left shoulder element coupled proximate to a left side of the first end of the middle elongated shaped element;
  a first catching feature proximate to the first end of the middle elongated shaped element, wherein the first catching feature is configured to mate with a second catching feature of a coupling element;
  a score spanning at least a portion of a width of each elongated shaped element, each score configured to allow each elongated shaped element to break away from an adjacent elongated shaped element;
 a coupling element configured to be removably coupled to the surface inside the automobile, the coupling element comprising:
  an attaching section for removably coupling the coupling element to a surface inside an automobile;

a second catching feature opposing an external object attaching section, wherein the second catching feature is configured to mate with the first catching feature so that the mobile device element can be removably coupled with the coupling element; and, wherein the mobile device element is configured to not obstruct a capturing device and a light emitting device of the mobile device by breaking away at least one elongated element.

11. The apparatus of claim 10, wherein the mobile device element is configured to couple to a plurality of different mobile devices without obstructing a capturing device and a light emitting component of each mobile device by breaking away at least one elongated shaped element.

12. The apparatus of claim 10, wherein the mobile device element is configured to couple to a plurality of different mobile device cases without obstructing a capturing device and a light emitting device of the mobile device covered by each case by breaking away at least one elongated shaped element.

13. The apparatus of claim 10, wherein the mobile device element is configured to be removably coupled to a rear surface of the mobile device.

14. The apparatus of claim 13, wherein the mobile device element is configured to couple to a rear surface of an Apple® mobile device without obstructing the light emitting device and capturing device by removing the right elongated shaped element and shoulder element from the middle elongated shaped element.

15. The apparatus of claim 13, wherein the mobile device element is configured to couple to a rear surface of a Samsung® mobile device without obstructing the light emitting device and capturing device by removing a portion of the middle elongated shaped element from a remainder of the middle elongated shaped element.

16. The apparatus of claim 10, wherein the first catching feature comprises an aperture on a non-planar body proximate to a first end of the middle elongated shaped element, the aperture comprising a lip configured for retaining the second catching feature thereon.

17. The apparatus of claim 10, wherein the second attaching feature comprises a second lip defined by a head at a first end of a protruding element.

18. An apparatus for coupling a mobile device to an external object, the apparatus comprising:
a mobile device element, the mobile device element comprising a mobile device facing surface and an opposing rear surface, wherein the mobile device facing surface comprises adhesive material for adhering to a mobile device surface, the mobile device element defining:
a first elongated shaped element aligned parallel to at least one auxiliary elongated shaped element;
a score spanning a width of at least one of the elongated shaped elements, each said score configured to allow each elongated shaped element to break away from an adjacent elongated shaped element;
a first catching feature proximate to the first end of the first elongated shaped element, wherein the first catching feature is configured to mate with a second catching feature of a coupling element;
a coupling element configured to be removably coupled with an external object and to the mobile device element, the coupling element comprising:
an external object attaching section for removably coupling the coupling element to the external object;
a second catching feature opposing the console attaching section, wherein the second catching feature is configured to mate with the first catching feature so that the mobile device element can be removably coupled with the coupling element; and,
wherein the mobile device element is configured to not obstruct a capturing device and a light emitting device of the mobile device by breaking away at least one elongated element.

19. The apparatus of claim 18, wherein the mobile device element is configured to couple to a rear surface of an Apple® mobile device without obstructing the light emitting device and capturing device by removing at least one elongated shaped element from the mobile device element.

20. The apparatus of claim 18, wherein the mobile device element is configured to couple to a rear surface of a Samsung® mobile device without obstructing the light emitting device and capturing device by removing at least one elongated shaped element from the mobile device element.

21. The apparatus of claim 18, wherein the first catching feature comprises an aperture on a non-planar body proximate to a first end of the first elongated shaped element, the aperture defining a lip configured for retaining the second catching feature thereon.

* * * * *